United States Patent Office 2,977,195
Patented Mar. 28, 1961

2,977,195
PROCESS FOR THE MANUFACTURE OF CUPROUS OXIDE

Charles Parkes Matzinger, Berkeley, Calif., assignor to The Mountain Copper Company, Ltd., a corporation of Great Britain No Drawing. Filed June 2, 1958, Ser. No. 738,991

2 Claims. (Cl. 23—147)

This invention relates to the manufacture of cuprous oxide. This material is employed for a wide variety of uses in both industry and agriculture; one of its best known uses is that of a componnent in marine paints. For this latter use, the specifications as to the quality of the material and its particle size are quite rigid.

It has been previously proposed to produce this material by reduction with sulfur dioxide of a basic copper compound with sulfur dioxide (Patent 2,665,192). I have found that by working completely on the acid side, the size of the material and its quality can be improved over that produced in accordance with the process of the aforementioned patent. Additionally, the reagent cost is reduced because one can employ sodium sulfite rather than sulfur dioxide as the reducing agent.

Briefly, the process of the present invention includes addition of sodium sulfite to an acid solution of copper sulfate to reduce cupric copper to cuprous copper and to form insoluble basic copper sulfite, followed by a pH adjustment by the addition of sulfuric acid or sodium hydroxide to bring the pH of the slurry to between 3.5 and 5.0, preferably about 4.2. Upon heating of the resulting slurry to near boiling, the basic cuprous sulfite decomposes to insoluble cuprous hydroxide, releasing sulfur dioxide which, in aqueous solution, forms sulfurous acid. The sulfurous acid reduces more cupric copper. The cuprous hydroxide is not stable at the elevated temperature and converts to a cuprous oxide precipitate. As the heating proceeds, the slurry becomes of increasing acidity and it is necessary to add additional caustic to maintain the acid strength to between 4 and 6 grams of sulfuric acid per liter, a pH of 2.6 to 2.8, usually 2.7. If this control is not exercised, then the metallic or free copper content of the resulting product increases and may become excessive.

The practice of the invention will become further apparent from the following example which is set forth to illustrate the practice of the invention: 5000 pounds of copper as basic copper sulfate, $CuSO_4 \cdot 3Cu(OH)_2$, were slurried together with 1500 pounds of copper as copper sulfate. The pH of the resulting solution was 3.1. 6300 pounds of sodium sulfite were then added, whereupon the pH rose to 5.2. Additional sulfuric acid was added to bring the pH to 4.2 to insure a cuprous oxide of the desired particle size. In the foregoing, 500 pounds of 98% acid were required.

Following the acid addition, the solution was at a temperature of 43° C. It was then heated as rapidly as possible to near boiling, 98° C., some 175 minutes being required. As the heating proceeded, the solution became more acid and additional caustic was added to hold the acid strength to between 4 and 6 grams of sulfuric acid per liter; 1900 pounds of caustic were added for this purpose. The yield was 5800 pounds of cuprous oxide of a red color and of an average size of 2 microns and smaller.

The copper sulfate solution can be provided from any source, e.g., it can be made from scrap copper and acid to provide a mixture of copper sulfate and basic copper sulfate slurry. In any case, the copper content of the slurry or solution is determined accurately because the stoichiometry of the process is tied to the copper content of the starting solution or slurry.

I claim:

1. A process for the manufacture of cuprous oxide of high purity comprising slurrying together basic copper sulfate, $CuSO_4 \cdot 3Cu(OH)_2$, and copper sulfate, adding thereto sodium sulfite to produce a mixture having a pH of about 5.2, acidifying said mixture to a pH of from 3.5 to 5, heating the mixture to a temperature of substantially the boiling point, adding an alkaline material to maintain a pH of from about 2.6 to 2.8 and recovering therefrom solid cuprous oxide, the entire process being carried out completely on the acid side.

2. A process for the manufacture of cuprous oxide of high purity comprising slurrying together about 5,000 parts of copper as basic copper sulfate, $$CuSO_4 \cdot 3Cu(OH)_2$$

with 1,500 parts of copper sulfate to produce a mixture having a pH of about 3.1, adding thereto about 6,300 parts of sodium sulfite to produce a mixture having a pH of about 5.2, acidifying said mixture to a pH of about 4.2, heating the said mixture to a temperature of substantially the boiling point, adding a caustic material to said mixture while heating to maintain an acid strength of between 4 and 6 grams of sulfuric acid per liter, and recovering therefrom cuprous oxide, the entire process being carried out completely on the acid side.

References Cited in the file of this patent

UNITED STATES PATENTS

| 2,280,168 | Stoddard | Apr. 21, 1942 |
| 2,665,192 | Rowe | Jan. 5, 1954 |

OTHER REFERENCES

Mellor: "Comprehensive Treatise on Inorganic and Theoretical Chemistry," Longmans, Green and Co., N.Y., vol. 10, p. 260 (1923).